US006891364B2

(12) United States Patent
Boie et al.

(10) Patent No.: US 6,891,364 B2
(45) Date of Patent: May 10, 2005

(54) SENSOR ARRANGEMENT FOR RECORDING THE MOVEMENT OF AN ARMATURE WITH SUPPRESSION OF INTERFERING VOLTAGES

(75) Inventors: Christian Boie, Aachen (DE); Lutz Kather, Würselen (DE); Hans Kemper, Aachen (DE); Günther Asmus, Titz-Höllen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 10/850,446

(22) Filed: May 21, 2004

(65) Prior Publication Data

US 2004/0261735 A1 Dec. 30, 2004

Related U.S. Application Data

(63) Continuation of application No. PCT/EP02/13003, filed on Nov. 20, 2002.

(30) Foreign Application Priority Data

Nov. 21, 2001 (DE) ........................................ 101 57 120

(51) Int. Cl.[7] .................................................. G01B 7/30

(52) U.S. Cl. .............................. 324/207.19; 324/207.25

(58) Field of Search ........................ 324/207.11–207.13, 324/207.15–207.21, 207.23–207.26, 240–244, 260–261; 123/406.58, 612, 617

(56) References Cited

U.S. PATENT DOCUMENTS

| | | | | |
|---|---|---|---|---|
| 4,866,378 A | | 9/1989 | Redlich | |
| 2003/0030958 A1 | * | 2/2003 | Saito et al. | 361/170 |

FOREIGN PATENT DOCUMENTS

| | | |
|---|---|---|
| DE | 197 39 840 A1 | 3/1999 |
| DE | 199 18 993 A1 | 9/2000 |
| EP | 0 170 723 B1 | 2/1986 |
| EP | 0 916 815 A2 | 5/1999 |
| EP | 1 136 662 A2 | 9/2001 |
| GB | 754917 A | 8/1956 |

* cited by examiner

*Primary Examiner*—Bot LeDynh
(74) *Attorney, Agent, or Firm*—Venable LLP; Catherine M. Voorhees

(57) ABSTRACT

A sensor arrangement for recording the movement of an armature on an electromagnetic actuator for operating a control element, in particular for operating a gas exchange valve of an internal combustion engine, has an axially displaceable bar-like sensor piece, made from a soft magnetic material, having a ring of electrically conducting material of low ohmic resistance. The sensor piece is connected to the control element and to a fixed coil arrangement surrounding the bar-like sensor arrangement at least over a partial length, the coil arrangement comprising at least two coils, arranged one behind the other and connected to a voltage supply and a signal recorder in the form of a carrier frequency measuring bridge, whereby the bar-like sensor piece reduces interfering voltages.

11 Claims, 3 Drawing Sheets

SENSOR ARRANGEMENT FOR RECORDING THE MOVEMENT OF AN ARMATURE WITH SUPPRESSION OF INTERFERING VOLTAGES

CROSS-REFERENCE TO RELATED APPLICATION

This is a continuation of International Patent Application No. PCT/EP02/13003 filed Nov. 20, 2002, designating the United States and claiming priority of German Patent Application No. 101 57 120.8 filed Nov. 21, 2001, the disclosures of both foregoing applications being incorporated herein by reference.

BACKGROUND OF THE INVENTION

With electromagnetic actuators that are used for actuating a control element, in particular a gas exchange valve on an internal combustion engine, recording the armature movement allows drawing conclusions about the actual movement conditions and, based on this, influencing the armature movement and thus also the movement of the control element to be actuated via the current supplied to the electromagnets of the actuators for the purpose of automatic control.

An electro-inductive sensor is used to record the movement, which sensor essentially consists of a fixed coil arrangement and a bar-shaped sensor piece that can be moved relative thereto, the bar-shaped sensor piece being connected to the control element and provided with a so-called eddy current ring, or short-circuit ring. The coil arrangement, which consists of at least two coils that are positioned successively in the axial direction, is supplied with a high-frequency alternating current, so that movements of the short-circuit ring relative to the coils change the electrical quality of the coils as a result of the opposing magnetic field generated in the short-circuit ring. The movement can be derived in the form of a signal from this movement-dependent change.

It is critical for the accuracy of this sensor technology that interfering voltages that are present in the system or are generated by the system itself are prevented, or at least are reduced enough, so that they do not interfere with the generated signal.

With an electromagnetic actuator for actuating a gas exchange valve in an internal combustion engine, having an armature that moves back and forth against the force of restoring springs between the pole faces of an opening magnet and a closing magnet that face each other at a distance, the armature in the respective end positions comes to rest against one of the pole faces. The arrangement in this case is such that a separate spring bolt is associated with the armature on the side of the armature adjacent to the closing magnet, the spring bolt operating jointly with the opening spring and supporting itself loosely, but being frictionally-connected on the armature.

The opening movement is initiated through a mechanical excitation of the bar-shaped sensor piece, also called a measuring stilt, which is rigidly connected to the spring bolt, as a result of the existing valve play between the gas exchange valve in the closing direction and the armature that rests against the closing magnet. This mechanical impact stress generates high-frequency structure-borne sound waves within the material of the spring bolt and the bar-shaped sensor piece connected thereto, which are then reflected at the ends and consequently traverse back and forth and cause longitudinal oscillations. These longitudinal oscillations interfere with the movement of the bar-shaped sensor piece and its short-circuit ring, leading to a corresponding interference that changes the coil quality, which in turn results in a high-frequency interference voltage. This voltage cannot be suppressed with the normally used evaluation device in the form of a carrier frequency measuring bridge, since the operating frequencies of the frequency measuring bridge and those of the interfering voltage are close together, thus making it impossible to obtain a usable signal.

Increasing the wattage of the feed voltage by a factor of 100 would only result in a gain of 20 dB with respect to the signal-to-noise ratio.

SUMMARY OF THE INVENTION

Thus, it is the object of the present invention to create a sensor arrangement that leads to a noticeable reduction in the interference voltage.

The above and other objects are accomplished according to the present invention by a sensor arrangement for detecting the movement of an armature on an electromagnetic actuator for actuating a control element, in particular for actuating a gas exchange valve on an internal combustion engine, comprising axially movable bar-shaped sensor piece of a soft-magnetic material and a fixed coil arrangement surrounding the bar-shaped sensor piece at least over part of the length of the sensor piece. The sensor piece, which is connected to the control element, has a ring of electrically conductive material with low ohmic resistance. The coil arrangement has at least two coils arranged successively in the axial direction of the sensor piece and is connected to a voltage supply and to a signal detection device in the form of a carrier frequency measuring bridge. The bar-shaped sensor piece has means for reducing interference voltages.

For a sensor arrangement to record the movement of an armature on an electromagnetic actuator for actuating a control element, in particular for actuating a gas exchange valve on an internal combustion engine, where the sensor arrangement comprises an axially movable bar-shaped sensor piece of a soft-magnetic material having a ring of electrically conductive material with low ohmic resistance (short-circuit ring), which is connected to the control element, as well as a fixed coil arrangement that encloses the bar-shaped sensor piece at least over a partial length with at least two successively arranged coils and is connected to a voltage supply and a signal recorder in the form of a carrier frequency bridge, this object is solved according to the invention by providing the bar-shaped sensor piece with means for reducing interfering voltages.

According to one exemplary embodiment of the invention, means are provided for damping the structure-borne sound waves that propagate in the bar-shaped sensor piece to reduce the interfering voltages. A noticeable reduction of interference voltages can be achieved simply by damping the structure-borne sound waves.

According to another exemplary embodiment of the invention, the exposed end of the bar-shaped sensor piece is provided with at least one end face that is inclined relative to the longitudinal axis of the bar-shaped sensor piece as a means for attenuating the structure-borne sound waves. Owing to this inclined end face, the reflection of the structure-borne sound waves generated in the bar-shaped sensor piece as a result of impact stresses is noticeably reduced. The length of the inclined end face advantageously corresponds to approximately six times the diameter of the sensor piece. The resulting pointed angle, relative to the longitudinal axis of the sensor piece, suppresses a reflection of the structure-borne sound waves in the direction of the other end of the sensor piece, wherein it makes sense to have a conically tapered end piece on the sensor piece.

According to one modification of the invention, an axial recess is provided on the bar-shaped sensor piece for damping the structure-borne sound waves. The recess can be cylindrical, meaning it can take the form of a simple longitudinal bore, so that the bar-shaped sensor piece has a tube-shaped design at least in the region near the coil. It is particularly advantageous if the axial recess is conically tapered, wherein the recess length, in particular the conical recess length, can advantageously measure approximately six times the diameter of the rod section. The advantage of this embodiment lies in a noticeable reduction in the length of the sensor piece.

According to another exemplary embodiment of the invention, the recess is filled with a magnetically permeable material having a different, preferably lower, modulus of elasticity than the material of the bar-shaped sensor piece. As a result, the readiness to oscillate of the bar-shaped sensor piece is clearly reduced, so that the structure-borne sound waves caused by the impact stress can propagate only to a limited degree within the bar-shaped sensor piece.

According to a different exemplary embodiment of the invention, the bar-shaped sensor piece of a soft-magnetic material is hardened for use as a means to suppress interference voltages. In principle, the bar-shaped sensor piece should be made of a soft-magnetic material, in particular an iron material, because of the desired magnetic properties. A material of this type has a high magneto-restrictive effect with respect to the signal-to-noise ratio. The magneto-restrictive effect is strongly reduced through hardening of the material used, so that significant interferences can no longer occur. The remaining magnetic properties are influenced only insignificantly, meaning in particular that the eddy current losses decrease and the magnetic reversal losses increase due to the hardening. As a result, the total effect is fairly neutral. There is no effect on the relative magnetic permeability, and/or this effect is within the tolerance range of the base material. The sensitivity of a hardened bar-shaped sensor piece is therefore not negatively influenced, while the damping effect is clearly improved.

BRIEF DESCRIPTION OF THE DRAWINGS

The invention is explained further with the aid of schematic drawings and exemplary embodiments, which show FIG. 1, an electromagnetic actuator for actuating a gas exchange valve.

DETAILED DESCRIPTION OF THE INVENTION

Figure 1:
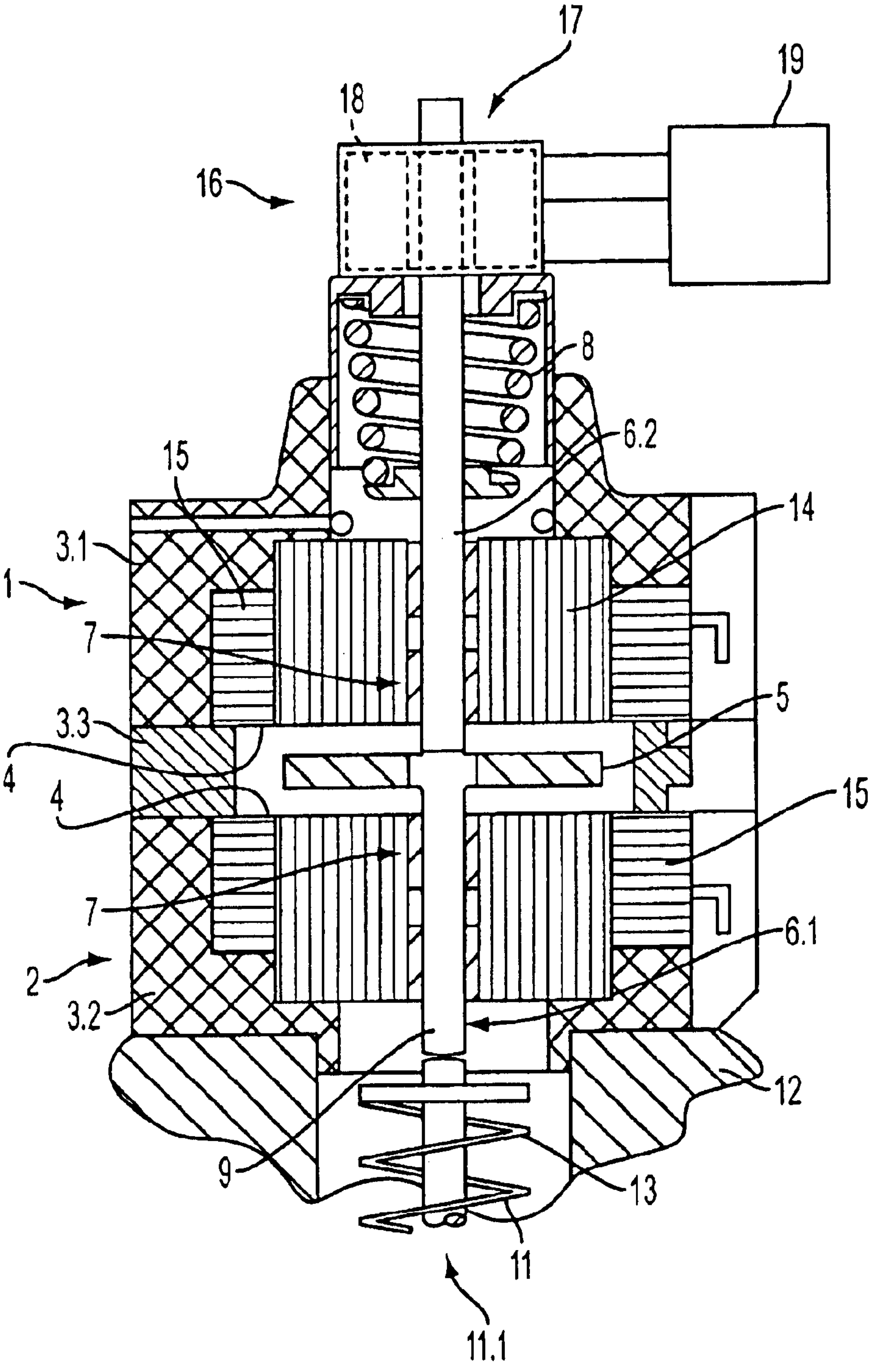

The electromagnetic actuator according to FIG. 1 essentially consists of two electromagnets 1 and 2, with the pole faces 4 arranged facing each other at a distance, wherein the electromagnets are enclosed by two housing parts 3.1 and 3.2, which in turn are arranged at a distance from each other by means of a housing part that is designed as a spacing section 3.3. An armature 5 that is guided by a guide bolt 6.1 to move back and forth inside a guide 7 is arranged in a movement area between the two pole faces 4, enclosed by the spacing section 3.3.

The armature 5 is connected to a resetting spring 8 via a spring bolt 6.2, which supports itself on the guide bolt 6.1 in the region of armature S. The other, lower and exposed end 9 of the guide bolt 6.1 in this case rests on a control element, for example, the exposed end of the shaft 11 of a gas exchange valve which is guided inside the cylinder head 12 of an internal combustion engine. With the aid of a resetting spring 13, the gas exchange valve is acted upon in a closing direction (arrow 11.1), wherein the resetting spring 13 and the resetting spring 8 have forces effective in opposite directions, so that if no current is supplied to the electromagnets, the armature 5 correspondingly occupies the idle position between the two pole faces 4 of the two electromagnets 1 and 2, as shown in FIG. 1. If the gas exchange valve is in the closed position, the armature 5 comes to rest against the pole face 4 of the closing magnet 1. In the process, the exposed end 9 of the guide bolt 6.1 lifts up slightly from the exposed end of the shaft 11, the amount of lifting up being the measure of the valve play.

The housing parts 3.1 and 3.2 of the two electromagnets enclose preferably cube-shaped yoke bodies 14 containing recesses and, disposed therein, ring-shaped coils 15. The coils 15 are respectively supplied alternately with current by a control device, not shown in further detail herein, for opening and closing the gas exchange valve.

The actuator end that is facing away from the gas exchange valve has a sensor arrangement 16 that essentially consists of a bar-shaped, or rod-shaped, sensor piece 17 that is rigidly connected thereto and in actuality represents an extension of the spring bolt 6.2. The bar-shaped sensor piece 17 is enclosed by a coil arrangement 18 that is connected to a voltage supply and signal detector, or evaluation device, 19. During the operation, the electrical quality, or condition, of the coil arrangement 18 is changed by the back and forth movement of the bar-shaped sensor piece 17. This change is proportional to the distance traveled by the sensor piece and, thus, is proportional to the distance traveled by the armature 5 and/or the control element 11. The mode of operation is explained in further detail in the following.

If the guide bolt 6.1 impacts the shaft 11, following its release by the closing magnet and passage through the valve play, the spring bolt 6.2 and thus also the connected bar-shaped sensor piece 17 are excited mechanically to generate structure-borne sound waves as a result of the impact stress. These structure-borne sound waves are reflected between the two end faces and interfere with the movement of the bar-shaped sensor piece, thus generating the interference signal.

Figure 2:
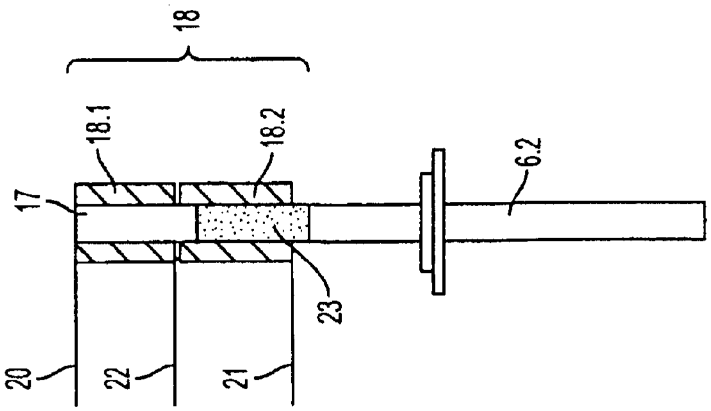
FIG. 2, a bar-shaped sensor piece with coil arrangement.

FIG. 2 shows a sensor arrangement embodiment for which the bar-shaped sensor piece 17 is surrounded by a two-part coil arrangement 18 that is connected via corresponding feed lines 20, 21 and 22 to the voltage supply and signal detector, or evaluation device, 19.

The illustrated bar-shaped sensor piece 17 is provided with a ring 23 of an electrically conductive material with low ohmic resistance, a so-called short-circuit ring. A sensor arrangement of this type operates on the eddy current principle. If the coil arrangement 18 is supplied with a high-frequency alternating current, so that a high-frequency magnetic field is generated through this coil arrangement, then an opposing magnetic field is generated in the short-circuit ring as a result of the developing eddy currents. If the bar-shaped sensor piece 17 with its short-circuit ring 23 is moved relative to the coils 18.1 and 18.2, the opposing magnetic field counteracts the originating high-frequency magnetic field of the coil arrangement 18 by displacing and weakening this field. On the outside, this is noticeable by a change in the coil characteristics that depends on the movement of the short-circuit ring 23 and, thus, the bar-shaped sensor piece 17, such that the position and thus the movement distance of the sensor piece 17 can be recorded with a corresponding signal. The characteristics of the two coils 18.1 and 18.2 are respectively provided by their inductivity and electrical quality, wherein the electrical quality is indicated by the ratio of reactive power to active power.

A sensor arrangement of this type operates with particular efficiency if the rod-shaped sensor part 17 is made of a ferritic material and the short-circuit ring 23 of copper.

With reference to the arrangement shown in FIG. 1, the bar-shaped sensor piece is shown in FIG. 2 for the opened position of the gas exchange valve.

If the bar-shaped sensor piece with the short-circuit ring 23 moves to the closed position (arrow 11.1), the opposing magnetic field generated by the eddy currents in the short-circuit ring 23 causes the above-described movement-dependent change in the quality of the coil 18.1 as well as in the coil 18.2.

Figure 3:
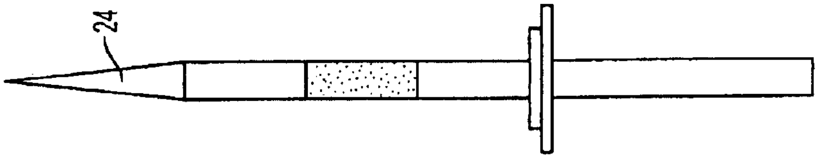
FIG. 3, an embodiment of the bar-shaped sensor piece with conical tip.

To reduce or suppress the above-described reflection of structure-borne sound waves in the spring bolt 6.2 and thus also in the bar-shaped sensor piece 17 on its level end face 24, the embodiment shown in FIG. 3 of the bar-shaped sensor piece 17 is provided with a conically tapered end face 24. The conical angle should be as narrow as possible to suppress a reflection of structure-borne sound waves in longitudinal direction by essentially reflecting them against the peripheral walls. It is useful in that case if the length of the conical end face 24 corresponds approximately to six times the diameter of the bar-shaped sensor piece 17. The end face does not necessarily have to correspond to a cone in the geometric sense, but can also have an ellipsoid design or the like. In general, it is advantageous to provide at least one end face that is inclined relative to the longitudinal axis of the sensor piece 17, e.g. by providing several indentations or also a single inclined section.

Figure 4:
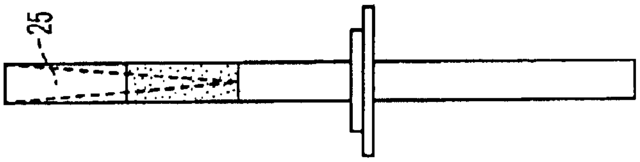
FIG. 4, a bar-shaped sensor piece with conical recess.

The embodiment shown in FIG. 4 is provided with a recess 25 in place of a tip. The recess can be cylindrical in shape, but advantageously is a conical recess that extends at least into the region of the short-circuit ring 23.

Figure 5:
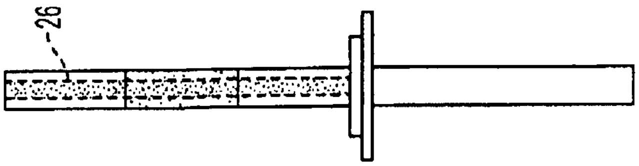
FIG. 5, a bar-shaped sensor piece with a filled-in recess.

A different modification is shown in FIG. 5. With this modification, the spring bolt 6.2 is provided over most of its length with an axial bore and/or has a tube-shaped design, wherein the inside space is filled with a material 26 having a different and preferably lower modulus of elasticity than the material of the spring bolt 6.2.

In addition to these purely "geometric" means for reducing and/or suppressing structure-borne sound waves, it is possible according to a different embodiment to harden the iron material at the end of the spring bolt 6.2, which functions as bar-shaped sensor piece, thereby changing its magnetic properties.

The short-circuit ring 23 can be a copper ring with a discrete wall thickness or can be formed by a thin copper layer deposited through electroplating, or a layer of a different material with good electrical conductivity.

Figure 6:
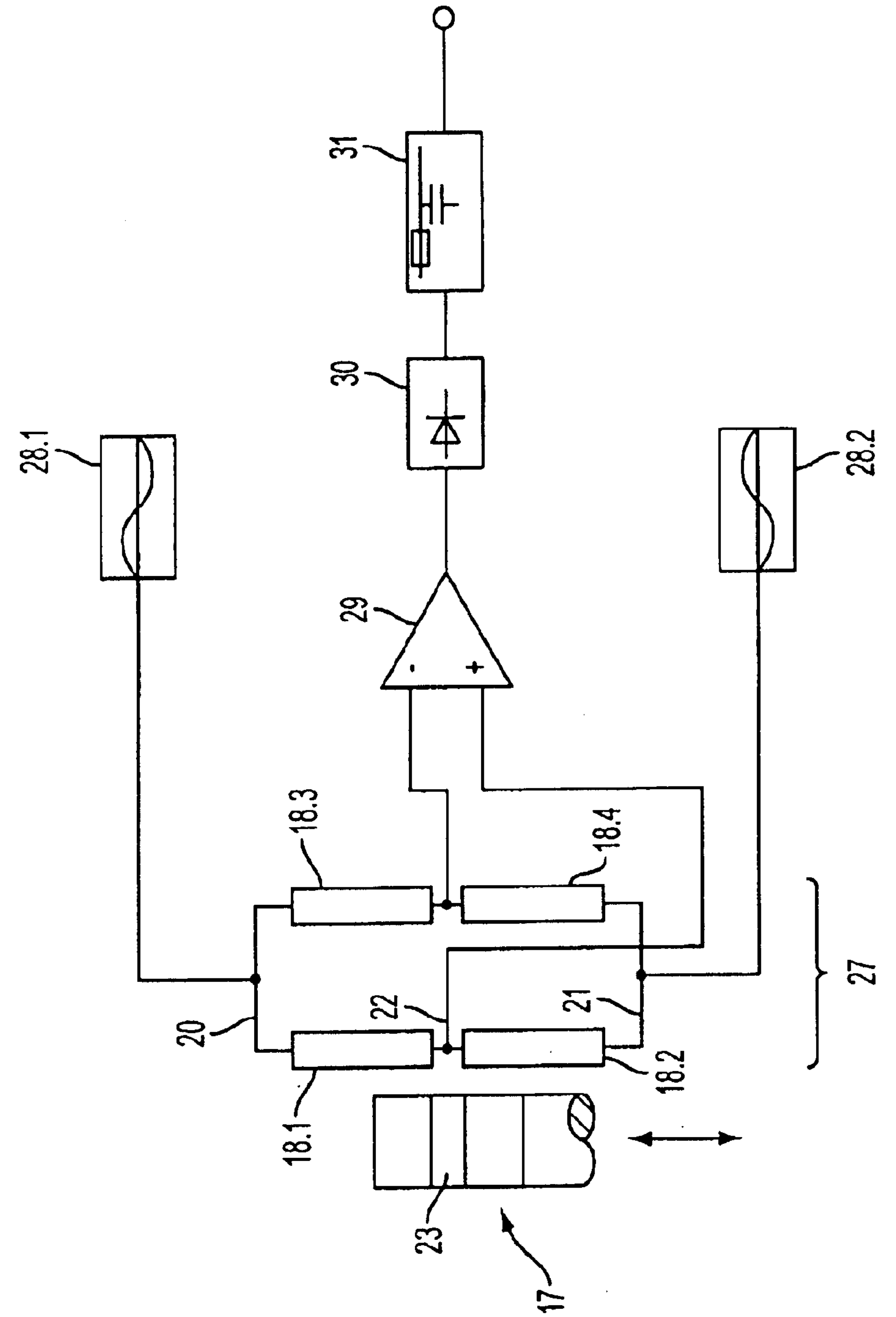
FIG. 6, a circuit arrangement.

FIG. 6 shows a schematic circuit for the recording of measuring values, in the form of a carrier frequency measuring bridge. The two coils 18.1 and 18.2 of the coil arrangement 18 are interconnected with two additional components, preferably resistances or coils 18.3 and 18.4, to form a carrier frequency measuring bridge 27. The bridge 27 is fed via at least one frequency generator 28 with a high-frequency alternating current, wherein the feeding advantageously occurs via two opposite phase frequency generators 28.1 and 28.2.

If the bar-shaped sensor piece 17 with its short-circuit ring 23, shown only schematically herein, is moved relative to the two coils 18.1 and 18.2 of the frequency bridge 27, the inductivity and the quality of the coils 18.1 and 18.2 are influenced by the opposing field of the eddy current ring. As a result, an "unbalancing" of the frequency bridge 27 results, which depends on the position of the short-circuit ring 23 relative to the two coils 18.1 and 18.2 and can be detected via a differential amplifier and band-pass filter 29. A distance-proportional signal can then be generated with the demodulator 30 and the low-pass filter 31, which can be processed further for control purposes, for example for actuating the gas exchange valves. The advantage in this case is that the signal is present over the complete distance traveled by the armature, such that the armature movement can be influenced even during the actual movement by triggering the current supply to the respectively capturing magnet, and also by influencing the supply to the releasing magnet. As a result of the inventive damping of the negative influences of structure-borne sound caused by impact stresses, a virtually "noise-free" signal can thus be generated, which also meets high accuracy requirements.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A sensor arrangement for detecting the movement of an armature on an electromagnetic actuator for actuating a control element, comprising:

an axially movable bar-shaped sensor piece of a soft-magnetic material, the sensor piece having a ring of electrically conductive material with low ohmic resistance, the sensor piece being connected to the control element; and a fixed coil arrangement surrounding the bar-shaped sensor piece at least over part of the length of the sensor piece, the coil arrangement having at least two coils arranged successively in the axial direction of the sensor piece and being connected to a voltage supply and to a signal detection device in the form of a carrier frequency measuring bridge, wherein the bar-shaped sensor piece has means for reducing interference voltages.

2. The arrangement according to claim 1, wherein the means for reducing interference voltages comprises means for damping structure-borne sound waves that propagate in the bar-shaped sensor piece.

3. The, arrangement according to claim 2, wherein the bar-shaped sensor piece includes an exposed end having an end face inclined relative to the longitudinal axis of the bar-shaped sensor piece, said means for damping structure-borne sound waves comprising said end face.

4. The arrangement according to claim 3, wherein the end face is formed by a conically tapered end piece.

5. The arrangement according to claim 2, wherein the bar-shaped sensor piece has a conically tapered end piece, said means for damping structure-borne sound waves comprising said end piece.

6. The arrangement according to claim 2, wherein the bar-shaped sensor piece has an axial recess having a conically tapered form, said means for damping structure-borne sound waves comprising said axial recess.

7. The arrangement according to claim 2, wherein the bar-shaped sensor piece has an axial recess filled with a magnetically permeable material having a modulus of elasticity different from the modulus of elasticity of the rest of the sensor piece, said means for damping structure-borne sound waves comprising said axial recess and said magnetically permeable material.

8. The arrangement according to claim 7, wherein the modulus of elasticity of the magnetically permeable material is lower than the modulus of elasticity of the rest of the sensor piece.

9. The arrangement according to claim 1, wherein the bar-shaped sensor piece comprises a hardened soft-magnetic material, said means for reducing interference voltages comprising said material.

10. The arrangement according to claim 9, wherein said material is an iron material.

11. The arrangement according to claim 2, wherein the bar-shaped sensor piece has an axial bore, and said means for damping structure-borne sound waves comprises said axial bore.

* * * * *